United States Patent [19]

Hirosaki et al.

[11] Patent Number: 4,639,939

[45] Date of Patent: Jan. 27, 1987

[54] APPARATUS FOR CANCELLING PERIODIC CARRIER PHASE JITTERS

[75] Inventors: Botaro Hirosaki; Osamu Tanaka, both of Tokyo, Japan

[73] Assignee: NEC Corporation, Tokyo, Japan

[21] Appl. No.: 702,656

[22] Filed: Feb. 19, 1985

[30] Foreign Application Priority Data

Feb. 20, 1984 [JP] Japan .................................. 59-29735
Dec. 28, 1984 [JP] Japan ................................ 59-277477

[51] Int. Cl.$^4$ .......................... H04L 7/02; H03L 7/00
[52] U.S. Cl. ................................... 375/118; 307/511; 328/162; 328/155
[58] Field of Search ...................... 375/14, 118, 102, 4, 375/99, 119; 307/511; 328/55, 155, 162, 164; 455/71, 259

[56] References Cited

U.S. PATENT DOCUMENTS

| | | | |
|---|---|---|---|
| 3,614,623 | 10/1971 | McAuliffe | 375/14 |
| 4,320,526 | 3/1982 | Gitlin | 375/14 |
| 4,447,910 | 5/1984 | Smith et al. | 375/118 |
| 4,479,258 | 10/1984 | Namiki | 455/295 |

Primary Examiner—Benedict V. Safourek
Assistant Examiner—Andrew J. Telesz, Jr.
Attorney, Agent, or Firm—Schwartz, Jeffery, Schwaab, Mack, Blumenthal & Evans

[57] ABSTRACT

The apparatus includes circuits for detecting sequential carrier phases of a complex baseband signal and storing the detected carrier phases. A phase predictor is responsive to the detected carrier phases for producing a predicted carrier phase. A circuit is also provided for compensating for a carrier phase deviation of the complex baseband signal in response to the predicted phase. An error detector detects an error associated with data discriminated from the complex baseband signal and a controller controls the phase predictor to minimize the error.

12 Claims, 10 Drawing Figures

FIG. 7
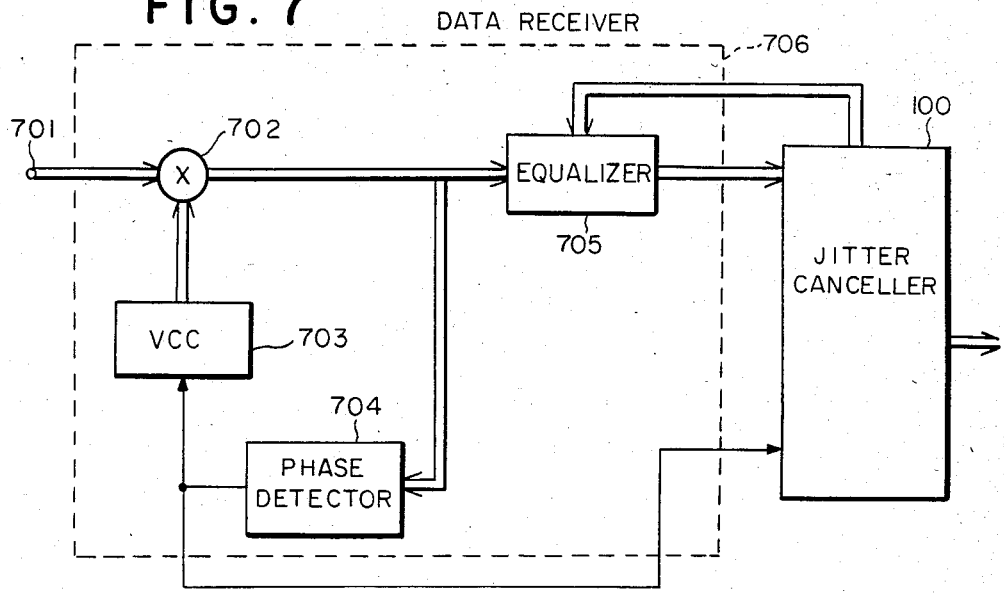
FIG. 8  JITTER CANCELLING SYSTEM
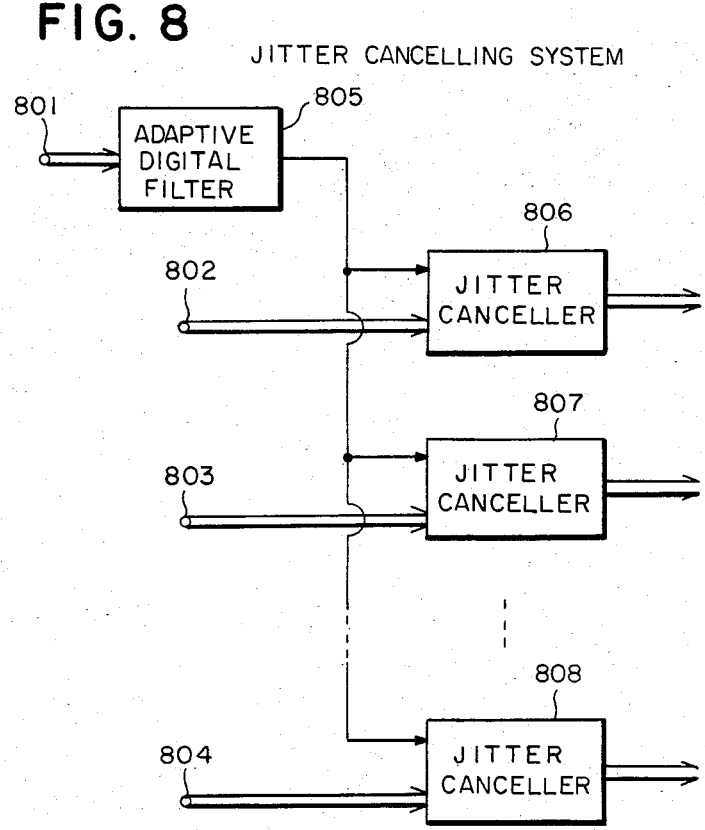

DATA RECEIVING SYSTEM

APPARATUS FOR CANCELLING PERIODIC CARRIER PHASE JITTERS

BACKGROUND OF THE INVENTION

The present invention relates to a data transmission system for transmitting data over telephone lines or like analog lines and, more particularly, to a jitter cancelling apparatus for carrier phase control associated with a receiver of such a data transmission system.

In a data transmission system, signals usually undergo various kinds of deterioration as typified by amplitude distortions, delay distortions, carrier frequency offsets and carrier phase jitters while being transmitted over lines. Among them, amplitude distortions and delay distortions are almost time-invariant or, if time-variant, the variation is slow enough to allow such distortions to be compensated for by so-called automatic equalizers. Carrier phase jitters, on the other hand, result in time-variant distortions and this kind of distortion has hitherto been absorbed by a phase locked loop or like feedback control system. However, since the carrier phase jitters develop in, for example, a carrier supply device of an analog transmission link and include periodic components approximating the ac (alternate current) cycle of 50 or 60 Hz of a commercial power source, the phase locked loop will fail to absorb 60 Hz jitters under a baud rate of 2400 Hz unless its equivalent quality factor is limited to less than 40. This deteriorates the Gaussian noise suppression ability of the phase locked loop.

SUMMARY OF THE INVENTION

It is, therefore, an object of the present invention to provide a jitter cancelling apparatus which accomplishes considerable jitter suppression without sacrificing the noise suppression ability of a conventional phase locked loop.

According to one aspect of the present invention, there is provided a jitter canceller which comprises means for detecting a carrier phase of a complex baseband signal, storing means for storing detected carrier phases; phase predicting means responsive to said detected carrier phases for producing a predicted carrier phase; means for compensating for a carrier phase deviation of said complex baseband signal in response to said predicted phase; error detecting means for detecting an error associated with data descriminated from said complex baseband signal; and means for controlling said phase predicting means to minimize said error.

BRIEF DESCRIPTION OF THE DRAWINGS

The above and other objects, features and advantages of the present invention will become more apparent from the following detailed description taken with the accompanying drawings in which:

FIG. 7 is a block diagram of a data receiver to which the jitter canceller of FIG. 1 is applied;

FIG. 8 is a block diagram showing a second embodiment of the present invention;

FIG. 9 is a block diagram of the adaptive digital filter of FIG. 8; and

In the drawings, the same or similar structural elements are designated by like reference numerals; thick lines represent complex signals and thin lines, real signals or control signals.

DESCRIPTION OF THE PREFERRED EMBODIMENTS

Figure 1:
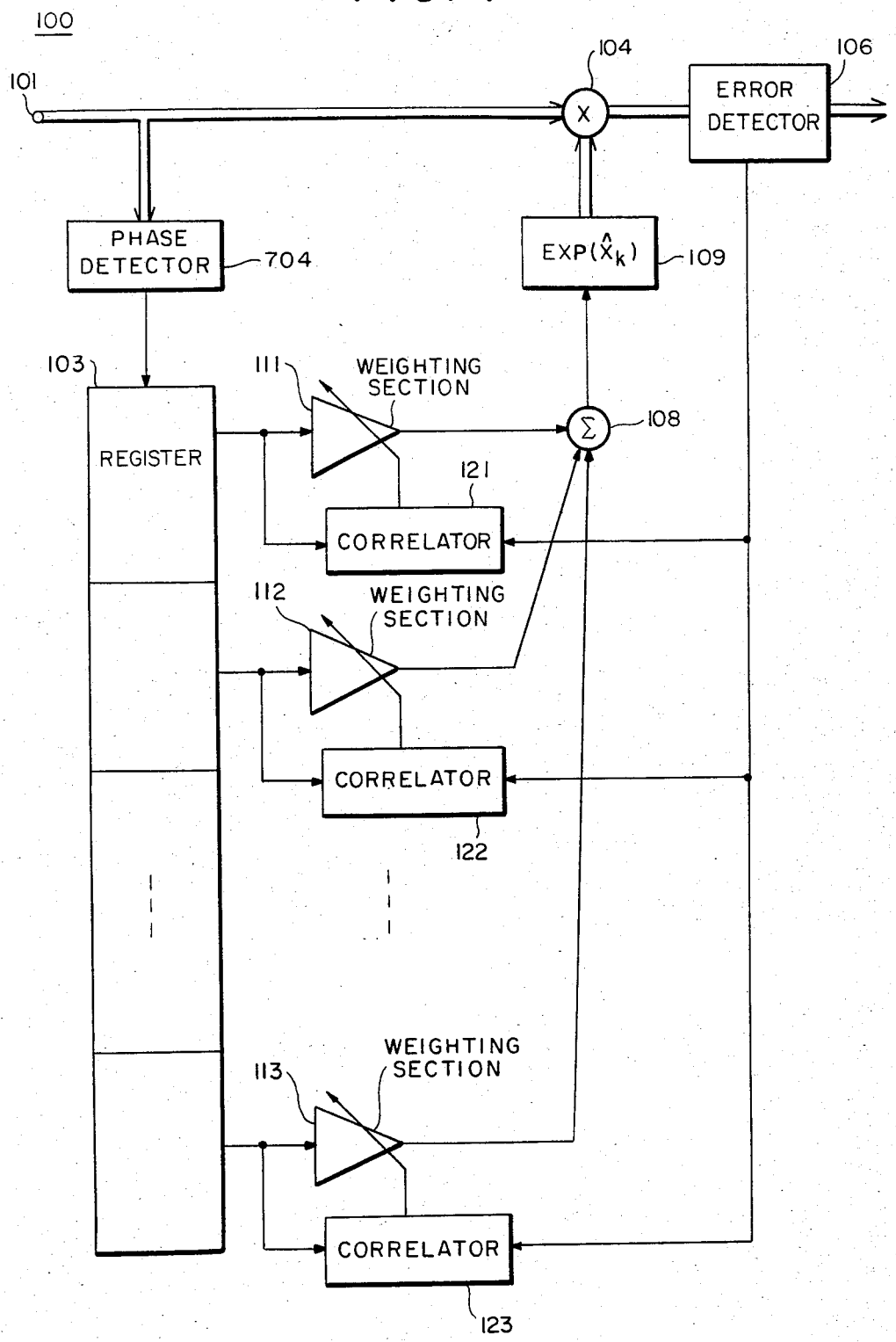
FIG. 1 is a block diagram showing a first embodiment of the present invention.

Before entering into a detailed description of the present invention, the principle thereof will be described.

Briefly, the principle of the present invention resides in predicting a carrier phase jitter, which is a cause of signal deterioration, and removing it based on the result of the prediction.

Assume that signal processing in a receiver of an intended data transmission system is performed by a sample value system whose period is $T_s$ seconds, and that an instantaneous phase observed at a time m is $y_m$. The instantaneous phase is represented by a sum of a true phase $x_m$ and noise $n_m$ introduced in the observation system:

$$y_m = x_m + n_m$$

Assuming that an estimated phase provided by linear weighted addition of observation sequences $\{y_m\}$ is $\hat{x}_k$, it is expressed as:

$$\hat{x}_k = \sum_{i=0}^{N-1} a_i y_{m-i}$$

where $a_0, a_1, \ldots, a_{N-1}$ are prediction coefficients, and N is a prediction order. The prediction accuracy of an estimated phase increases with N as will be described later. The difference between the suffixes k and m reflects a difference in time between a point of phase observation and a point of verifying correctness of an estimated phase.

The prediction coefficients $a_0, a_1, \ldots, a_{N-1}$ have to be so adjusted as to accomplish as correct an estimated phase as possible and, for this purpose, correctness of the estimated phase $\hat{x}_k$ has to be verified in one way or another. If the true phase $x_k$ is known, it will suffice to predetermine the prediction coefficients $a_0, a_1, \ldots, a_{N-1}$ such that a mean value of a square $(x_k - \hat{x}_k)^2$ of an estimation error becomes minimum. However, if the true phase $x_k$ is known, estimating it is needless from the beginning; usually, $x_k$ is unknown. It is impossible, therefore, to employ the mean of $(x_k - \hat{x}_k)^2$ as an evaluation function for determining the prediction coefficients. Fortunately, however, a discriminated error $Z_k$ included in discriminated data after the phase compensation using an estimated phase $\hat{x}_k$ is substantially $$Z_k = (x_k - \hat{x}_k) \times C + \alpha_k$$

where C is a constant, and $\alpha_k$ is noise which has no correlation with $x_k$ or $\hat{x}_k$. In this instance, a mean square value J of the error $Z_k$ is produced by $$J = \overline{(x_k - \hat{x}_k)^2} \times C + A$$

where A is a power of $\alpha_k$. It follows that if the prediction coefficients $a_0, a_1, \ldots, a_{N-1}$ are predetermined to minimize the mean square value of the discrimination error, the resulting prediction coefficients will be those which make the mean value of $(x_k - \bar{x}_k)^2$ minimum.

Hence, if prediction coefficients $a_0(k+1), a_1(k+1), \ldots a_{N-1}(k+1)$ at a time $(k+1)$ are adjusted one after another in relation to prediction coefficients $a_0(k), a_1(k), \ldots a_{N-1}(k)$ at a time k using an equation shown below, prediction coefficients which provide a minimum $(x_k - \bar{x}_k)^2$ are obtainable:

$$a_i(k+1) = a_i(k) - \epsilon \frac{\partial Z^2_k}{\partial a_i(k)}, i = 0, 1, \ldots, N-1$$

where $\epsilon$ is an adjustment coefficient and $1/\epsilon$ denotes a period of time for averaging $Z^2_k$. The above equation may be rewritten as:

$$a_i(k+1) = a_i(k) - 2\epsilon \cdot Z_k \cdot \frac{\partial Z_k}{\partial a_i(k)}, i = 0, 1, \ldots, N-1$$

This kind of adjustment algorithm is generally known by the name of a method of steepest-descent. Convergence of the algorithm is insured so long as the correlation matrix $\phi$ as defined by the following equation is a positive constant:

$$\phi = \begin{bmatrix} R_{yy}(0), & R_{yy}(1), \ldots, & R_{yy}(N-1) \\ R_{yy}(-1), & R_{yy}(0), \ldots, & R_{yy}(N-2) \\ \vdots & & \\ R_{yy}(-N+1), & R_{yy}(-N+2), \ldots, & R_{yy}(0) \end{bmatrix}$$

where $R_{yy}(1) = \overline{y_m \cdot y_{m+1}}$.

Fundamentally based on the above-described principle, the present invention contemplates to removal of carrier phase jitters by rotating the phase of a received complex baseband signal by a predicted phase.

Assuming that the k-th sample value of a complex baseband signal is $\gamma_k$, and that a complex signal provided by rotating the phase thereof by $\bar{x}_k$ is $\eta_k$, there holds a relation:

$$\eta_k \gamma_k \cdot \exp(-j\bar{x}_k)$$

If $\eta_k$ is a complex signal resulting from demodulation of a VSB (vestigial-sideband modulation) signal, its real part carries desired data and, hence, the discrimination error $Z_k$ is produced by $$Z_k = R_e\{\eta_k\} - d_k$$

where $R_e\{\cdot\}$ represents an operation for obtaining the real part while $d_k$ represents discriminated data. Therefore, $$\frac{\partial Z_k}{\partial a_i(k)} = R_e\left(\frac{\partial \eta_k}{\partial a_i(k)}\right)$$

$$= Im\{\eta_k\} \cdot \frac{\partial x_k}{\partial a_i(k)}$$

$$= Im\{\eta_K\} \cdot y_{m-i}$$

where Im $\{\eta\}$ represents a signal associated with an imaginary part of $\eta_k$. The adjustment algorithm for prediction coefficients may thus be written as:

$$a_i(k+1) = a_i(k) - 2\epsilon \cdot Z_k \cdot Im\{\eta_k\} \cdot y_{m-i} \quad \text{Eq. (1)}$$

What the equation (1) implies is as follows. The i-th prediction coefficient at the time $(k+1)$ is provided by subtracting from the i-th prediction coefficient at the time k a product of a quantity of adjustment which is multiplied by a suitable adjustment coefficient. That is, the i-th quantity of adjustment at the time k is provided by multiplying a common quantity, which is a product of a discrimination error $Z_k$ at the time k and an imaginary part at the time k, by $y_{m-i}$ which is an output of the i-th stage of a register.

Meanwhile, if $\eta_k$ is a complex signal resulting from demodulation of an ordinary QAM (quadrature-amplitude modulation) signal, then a prediction coefficient adjustment algorithm corresponding to the equation (1) may be expressed as:

$$a_i(k+1) = a_i(k) - 2\epsilon \cdot \{Z_{R,k} \cdot Im\{\eta_k\} + Z_{I,k} \cdot R_e\{\eta_k\}\} \cdot y_{m-1} \quad \text{Eq. (2)}$$

where $Z_{R,k}$ and $Z_{I,k}$ represent respectively a real part discrimination error and an imaginary part discrimination error, respectively. The equations (1) and (2) may be generalized as an adjustment algorithm:

$$a_i(k+1) = a_i(k) - \epsilon \cdot \epsilon_k \cdot y_{m1\ i}$$
k m

Here, $\xi_k$ is regarded as a signal associated with a phase compensation error at the time k.

Referring now to FIG. 1 of the drawings, a jitter canceller embodying the present invention and based on the principle described above is shown in a block diagram. The jitter canceller, generally 100, comprises an input terminal 101 to which a complex baseband signal is applied, a phase detector 704 for detecting an instantaneous phase of the complex baseband signal and a register 103 to which instantaneous phases are sequentially stored. The first stage output of the register 103 is weighted by a prediction coefficient at, for example, a first weighting section 111, the second register stage output at a second weighting section 112, and the final register stage output at the final weighting section 113. The respective weighted results are added up by an adder 108 to provide a predicted value $\bar{x}_k$ of an instantaneous phase. A complex trigonometric function generator 109, in response to the predicted value $\bar{x}_k$, produces a complex signal $\exp(-j\bar{x}_k)$ which comprises a real part $\cos \bar{x}_k$ and an imaginary part $-\sin \bar{x}_k$. A phase rotator 104 multiplies a complex signal applied thereto from the input terminal 101 by the $\exp(-j\bar{x}_k)$ supplied from the complex trigonometric function generator 109, applying the product to an error detector 106. The error detector 106 functions to discriminate received data in conformity to a specific modulation system such as VSB or QAM while providing a discrimination error signal associated therewith. The error signal is immediately fed back to correlators 121, 122 and 123. Each of the correlators 121-123 computes a correlation between the error signal and the output of the register stages of register 103 associated therewith, thereby adjusting the prediction coefficient in the associated weighting section 111, 112 or 113 to reduce the correlation.

Figure 2:
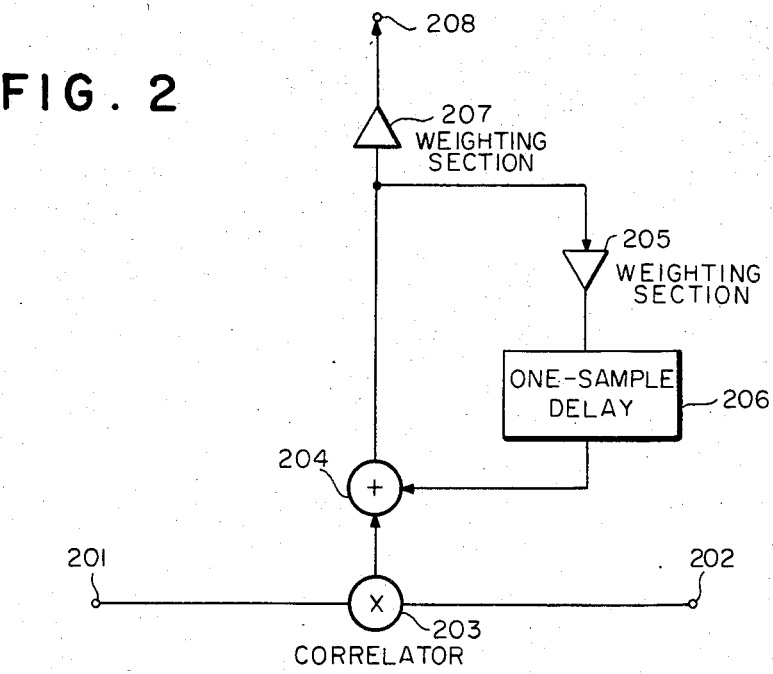
FIGS. 2-6 and 9 are block diagrams showing various parts of the present invention in detail.

Various schemes may be contemplated for constructing the correlators 121, 122 and 123 shown in FIG. 1 and one example is shown in FIG. 2. In FIG. 2, the register output is applied to a terminal 201 of the correlator and the error signal to a terminal 202, and they are led to a multiplier 203 to provide a product. The resulting product is supplied to an integrator, which is made up of an adder 204, a first weighting section 205 and a one-sample delay 206, to be thereby averaged with respect to a given sampling time. At this instant, assuming that the weighting coefficient of the first weighting section 205 is $\beta(\beta<11)$, the integrating time is determined by $1/(1-\beta)$. The integrated signal is multiplied by a suitable coefficient by a second weighting section 207 and, then, applied to an output terminal 208 as an adjusting signal for the previously mentioned prediction coefficient.

Figure 3:
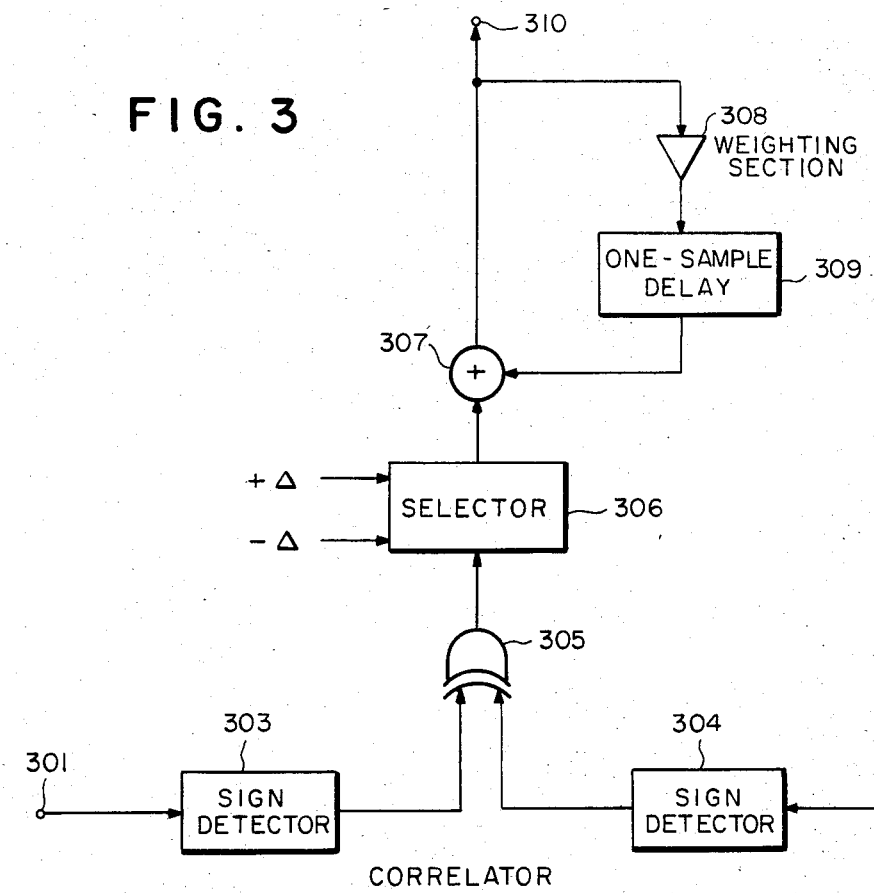

Another specific structure of the correlators shown in FIG. 1 is shown in FIG. 3. The correlator of FIG. 3 comprises signal detectors 303 and 304, an Exclusive-OR gate (EXOR) 305 and a selector 306. The signal detectors 303 and 304 detect respectively a polarity of the output of the register 103 given from an input terminal 301 and that of the error signal supplied from an input terminal 302, and the detected polarities are applied to the EXOR 305. The EXOR 305 supplies a control terminal of the selector 306 with a logical "1" if the detectors 303 and 304 share the same polarity and a logical "0" if otherwise. In response to the logical level of the control signal, the selector 306 selects a positive value $+\Delta$ or a negative value $-\Delta$ and applies its output to an integrator, which comprises an adder 307, a weighting section 308 and a one-sample delay 309. The integrator smooths the output of the selector 306 to produce an adjusting signal for the prediction coefficient, the adjusting signal being sent out from an output terminal 310.

Figure 4:
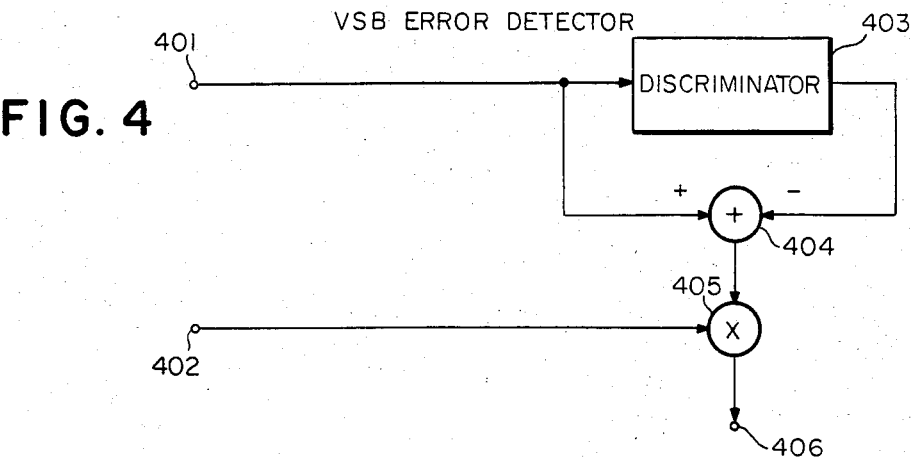
Figure 5:
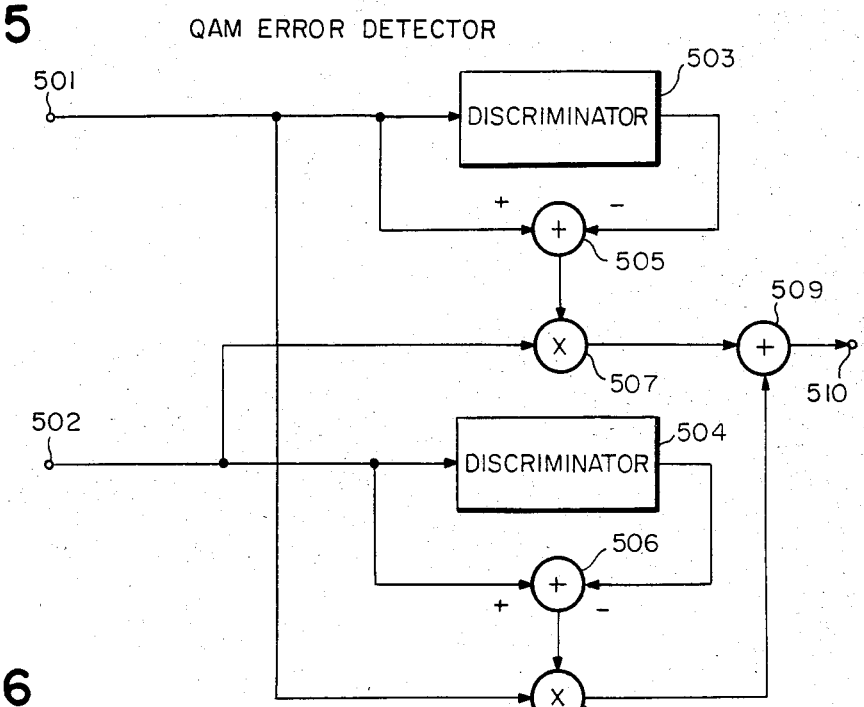

The structure of the error detector 106 shown in FIG. 1 depends upon the modulation system used. In the case where a VSB modulation system is used, the error detector 106 may be constructed as shown in FIG. 4 by way of example. In FIG. 4, a real part and an imaginary part of a complex baseband signal are applied to input terminal 401 and 402, respectively. A discriminator 403 discriminates data carried by the real part, while an adder 404 detects discrimination error. The error signal is multiplied by the imaginary part in a multiplier 405 to produce a phase compensation signal to an output terminal 406.

Where the modulation system is QAM, on the other hand, the error detector 106 may be constructed shown in FIG. 5. In FIG. 5, real and imaginary parts of a complex baseband signal are entered through input terminals 501 and 502, respectively. Discriminators 503 and 504 respectively discriminate data which are carried by the real and imaginary parts of the complex baseband signal. Adders 505 and 506 serve to detect discrimination errors in the real and imaginary parts of the baseband signal, respectively. A multiplier 507 multiplies the error in the real part of the baseband signal by the imaginary part of the baseband signal, while a multiplier 508 multiplies the error in the imaginary part of the baseband signal by the real part of the baseband signal. The two different products are added by an adder 509 to produce a phase compensation signal, which is applied to an output terminal 510.

Figure 6:
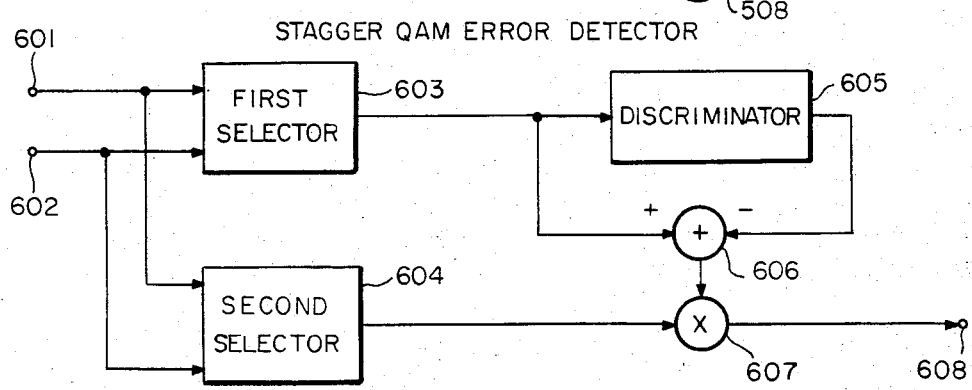

A specific construction of the error detector 106 usable with stagger QAM is shown in FIG. 6. In stagger QAM, real and imaginary parts of a complex baseband signal, which arrive at input terminals 601 and 602, alternately carry data each by one sample. The error detector 106 includes a first selector 603 for selecting one of the two signals which carries data, while applying the selected signal to a discriminator 605. Meanwhile, a second selector 604 selects the other of the two signals which does not carry data, while applying the selected signal to a multiplier 607. A subtractor 606 detects discrimination error which is then led to the multiplier 607. The multiplier 607 multiplies the two signals by each other to deliver a phase compensation signal to an output terminal 608.

Referring to FIG. 7, a basic construction of a data receiving system to which the specific jitter canceller described above is applied is shown in a block diagram. A complex baseband signal supplied to an input terminal 701 is applied to a phase control loop made up of a phase rotator 702, a phase detector 704 and a voltage controlled oscillator 703, whereby phase variations sufficiently slower than the sampling rate are absorbed. The output of the phase control loop is fed to an ordinary automatic equalizer 705 so as to equalize amplitude distortions and delay distortions caused by a transmission line. Therefore, the output of the equalizer 705 contains only jitters in that the phase variation is fast with respect to time. The jitters are absorbed by the jitter canceller 100 in accordance with the present invention. A discrimination error signal necessary for the adjustment of tap coefficients of the equalizer 705 is provided by the jitter canceller 100. It follows that the tap coefficients of the equalizer 705 are free from fluctuation due to jitters, insuring the expected equalizing function. An instantaneous phase to be stored in the register of the jitter canceller is provided by the phase detector 704. A certain delay exists between the complex baseband signal applied to the jitter canceller 100 and the instantaneous phase contained in the baseband signal for predicting a jitter. However, such a delay does not bring about noticeable deterioration to jitter cancelation characteristics of the jitter canceller because, usually, jitters are mostly a periodic component.

Referring to FIG. 8, a second embodiment of the present invention is shown in a block diagram. This embodiment is suitable for use with parallel data transmission which employs a plurality of carriers. In FIG. 8, the jitter cancelling system comprises an input terminal 801 to which a pilot signal is applied, and input terminal 802-804 to which first to third complex baseband signals are applied, respectively. An adaptive filter 805 extracts high-speed periodic phase jitters having a large signal-to-noise (S/N) ratio out of the pilot signal, applying the jitters as a reference jitter to jitter cancellers 806-808. The jitter cancellers 806-808 remove the high-speed periodic phase jitters from the respective complex baseband signals. The order of the adaptive filter 805 is selected such that even with the worst S/N ratio predicteable in the pilot signal there can be supplied a reference jitter whose S/N ratio is larger enough for the jitter cancellers 806-808 to accomplish their predetermined function. Each of the jitter cancellers 806-808 may be implemented by the structure shown in FIG. 1.

Figure 9:
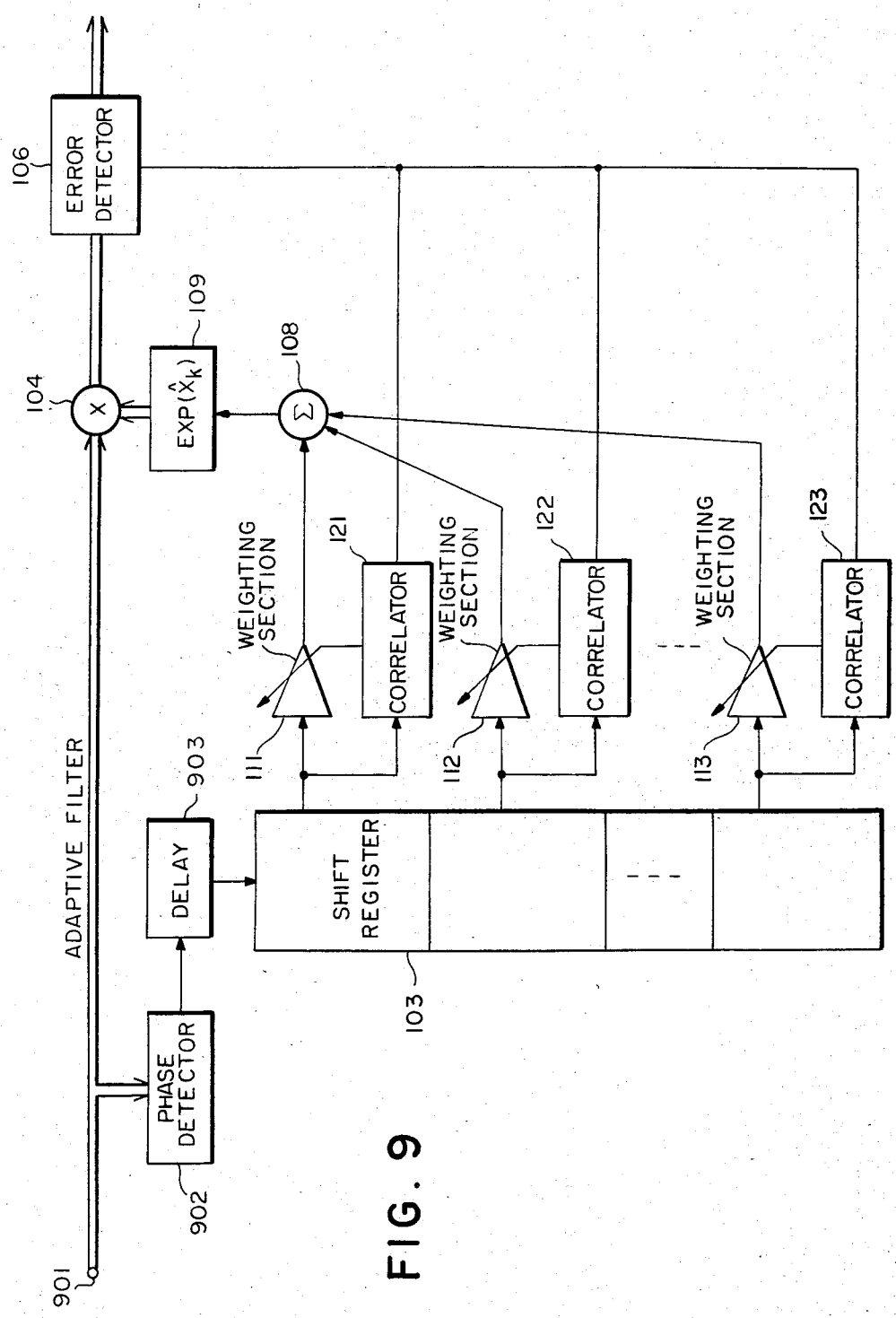

A specific construction of the adaptive filter 805 for reference extraction is shown in FIG. 9. In FIG. 9, a phase detector 902 detects the instantaneous phase of the pilot signal and applies it to the shift register 103 via a delay 903. Outputs of the respective stages of the shift register 103 are weighted by their associated weighting sections 111-113 by prediction coefficients applied from the correlators 121-123. The respective weighted results are added up by the adder 108 an output of which is led to the complex trigonometric function generator 109 as a predicted instantaneous phase $x_k$ and to the jitter cancellers 806–808 as the reference jitter. In the structure of FIG. 9, the delay 903 serves to prevent the correlation of noise components from being reflected by the weighting sections 111–113.

Figure 10:
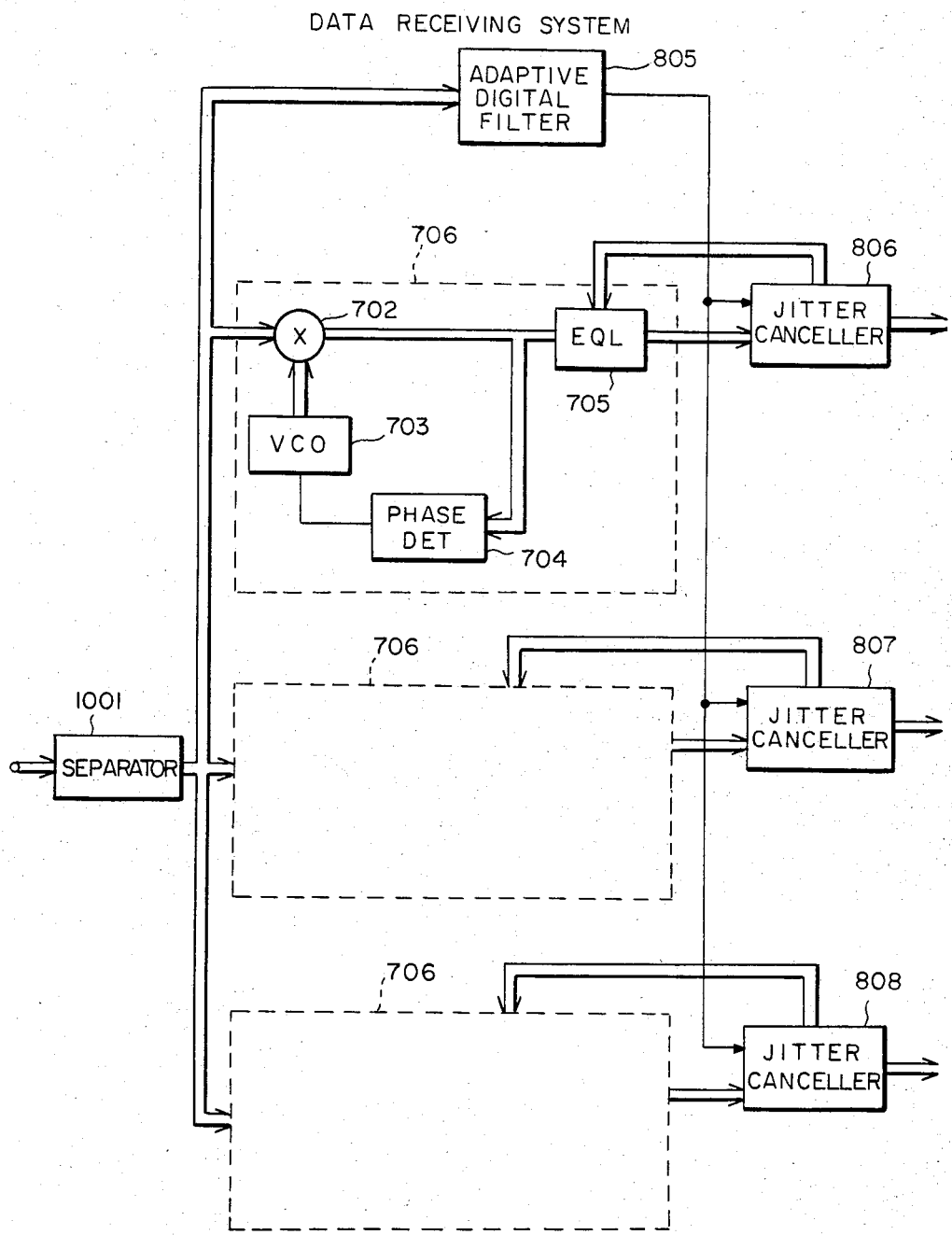
FIG. 10 is a block diagram of a data receiver to which the jitter canceller of FIG. 8 is applied.

Referring to FIG. 10, there is shown in a block diagram a data receiving system to which the jitter cancelling system of FIG. 8 is applied. A separating circuit 1001 separates received data into a pilot signal and respective complex baseband signals associated with the individual data channels. The pilot signal is supplied to the adaptive filter 805 assigned to a reference jitter, while the respective baseband signals are coupled to pre-processors 706 which are provided in one-to-one correspondence with the data channels. Each of the pre-processors 706 comprises an equalizer 705 for equalizing amplitude distortions and delay distortions, and a phase locked loop for absorbing slow phase variations which is made up of a voltage controlled oscillator 703, a phase detector 704 and a phase rotator 702. The circuitry shown in FIG. 10, like the circuitry shown in FIG. 7, is capable of removing slow phase variations and fast periodic jitters in the respective channels.

As described above, it will be seen that the present invention provides a jitter canceller which suppresses faster phase variations after sufficiently slow phase variations are suppressed by a phase control loop.

What is claimed is:

1. An apparatus for removing a periodic carrier phase jitter from a complex baseband signal, comprising:
   means for detecting sequential carrier phases of the complex baseband signal;
   storing means for storing said detected carrier phases;
   phase predicting means responsive to outputs of said storing means for producing a predicted carrier phase;
   means for compensating for a carrier phase deviation of said complex baseband signal in response to said predicted carrier phase and for producing a phase deviation compensated complex baseband signal;
   error detecting means responsive to said phase deviation compensated complex baseband signal for detecting an error;
   means for controlling said phase predicting means in response to said error to minimize said error.

2. A jitter cancelling apparatus as claimed in claim 1 wherein said storing means comprises a shift register.

3. A jitter cancelling apparatus as claimed in claim 1 wherein said phase predicting means comprises correlating means for calculating correlations between said detected carrier phases and said error, weighting means for weighting said detected carrier phases by outputs of said correlating means, and adding means for adding up weighted signals supplied from said weighting means.

4. A jitter cancelling apparatus as claimed in claim 1 wherein said compensation means comprises means responsive to said predicted carrier phase for generating a complex trigonometric function and means for rotating said complex baseband signal by an angle defined by said complex trigonometric function.

5. A jitter cancelling system for parallel data transmission using a plurality of complex baseband signals and a pilot signal, comprising:
   means for detecting a reference carrier phase from said pilot signal;
   jitter cancelling apparatus provided in one-to-one correspondence to each of said plurality of complex baseband signals for removing a periodic carrier phase jitter from said each complex baseband signal, each of said jitter cancelling apparatus comprising:
   means for detecting carrier phases of said each complex baseband signal;
   storing means for storing said detected carrier phases and said detected reference carrier phases;
   phase predicting means responsive to outputs of said storing means for producing a predicted carrier phase;
   means for compensating for a carrier phase deviation of said each complex baseband signal in response to said predicted carrier phases and producing a phase deviation compensated complex baseband signal;
   error detecting means for responsive to said phase deviation compensated complex baseband signal for detecting an error;
   means for controlling said phase predicting means to minimize said error.

6. A jitter cancelling apparatus as claimed in claim 1 where in said error detecting means comprises a discriminator for determining data from a real part of said complex baseband signal, means for subtracting said data from said real part of said complex baseband signal, and means for multiplying the result of said subtraction by the imaginary part of said complex baseband signal to produce a phase error signal.

7. A jitter cancelling apparatus as claimed in claim 3 wherein said correlating means comprises an integrator.

8. A jitter cancelling apparatus as claimed in claim 1 including means for delaying said sequential carrier phases of the complex baseband signal before storage in said storing means.

9. A jitter cancelling apparatus as claimed in claim 3 in combination with a phase control loop connected before said jitter canceller, said phase control loop comprising a phase rotator for rotating the phase of said complex baseband signal, a phase detector for detecting the phase of said complex baseband signal, and a voltage controlled oscillator reponsive to said phase detector for applying a controlled signal to said phase rotator to absorb phase variations which are slow relative to a sampling rate of said complex baseband signal.

10. A method for removing a periodic carrier phase jitter from a complex baseband signal, comprising:
    detecting sequential carrier phases of the complex baseband signal;
    storing said detected carrier phases;
    producing a predicted carrier phase using said stored detected carrier phases;
    compensating a carrier phase deviation of said complex baseband signal in response to said predicted phase;
    detecting an error associated with data discriminated from said complex baseband signal;
    adjusting said predicted carrier phase in response to said detected error in order to minimize said detected error.

11. A method as set forth in claim 10 wherein said step of producing a predicted carrier phase comprises calculating correlations between said stored detected carrier phases and said error, weighting said detected carrier phases in response to said correlations, and adding up weighted signals to produce said predicted carrier phase.

12. A method as set forth in claim 10 wherein said step of compensating comprises generating a complex trigonometric function in reponse to said predicted phase for rotating said complex baseband signal by an angle defined by said complex trigonometric function.

* * * * *